United States Patent

[11] 3,623,500

| [72] | Inventor | Donald D. Hoy |
| | | P.O. Box 197, Highland, Mich. 48031 |
| [21] | Appl. No. | 888,619 |
| [22] | Filed | Dec. 29, 1969 |
| [45] | Patented | Nov. 30, 1971 |

[54] FLUID CONDUIT CONTROL
3 Claims, 10 Drawing Figs.

[52] U.S. Cl. ................................................ 137/344,
[51] Int. Cl. ................................................ 137/615
[50] Field of Search ...................................... B05b 9/02
137/344,
354, 355.16, 355.2, 615

[56] References Cited
UNITED STATES PATENTS
| 1,203,602 | 11/1916 | Fulton | 137/615 X |
| 2,915,081 | 12/1959 | Warren | 137/344 |
| 2,948,306 | 8/1960 | Kuraeff | 137/615 UX |
| 3,439,700 | 4/1969 | Preston | 137/615 X |
| 3,464,859 | 9/1969 | Hamrick | 137/355.16 X |
| 3,469,601 | 9/1969 | Harper | 137/615 |
| 3,496,959 | 2/1970 | Wolfe et al. | 137/344 |
| 3,520,725 | 7/1970 | Hamrick | 137/355.16 X |

*Primary Examiner* — Samuel Scott
*Attorney* — Gerald R. Hershberger

ABSTRACT: My invention provides a selectively adjustable, flexible, expandable and rigid fluid conduit control for aboveground carrying off of fluids, liquids or other matter. The device may be connected to portable houses such as travel trailers, campers, truck campers, or motor homes for carrying off liquids or other waste matter from such houses.

PATENTED NOV 30 1971　　3,623,500

DONALD D. HOY
INVENTOR.

BY Gerald R. Hershberger
ATTORNEY

FLUID CONDUIT CONTROL

BACKGROUND OF THE INVENTION

1. Field of the Invention

My invention relates to a fluid conduit control, and more particularly to a fluid conduit control which is attached to a portable or mobile house for carrying off liquids or waste matter from such house to a sewer or septic tank.

2. Description of the Prior Art

There is at least one device which has been marketed during recent time for use as a sewer outlet for portable houses, such as a flexible hose connected to said house and mounted on inclined ground-supported ramp to maintain an incline in the hose. This has the disadvantage for most owners that it is cumbersome and unwieldly to handle, does not store easily and is subject to damage or rupture. The present invention provides an aboveground sewer conduit for portable homes which has a self-sustaining incline for proper drainage, and which is compact, is easily stored, and protected from damage or rupture.

SUMMARY OF THE INVENTION

It is an object of this invention to provide a fluid conduit control comprising a body which is flexible and expandable and contractable in accordionlike manner having openings at both of its ends, and which is carried by a substantially rigid lightweight semitubular shell, which shell restricts the expansion and contraction of the body within the limits of the shell and permits the body to be selectively extended manually from such shell at selected points along the length of such shell.

It is a further object of this my invention to provide a fluid line control which comprises a portable house offal tank having an outlet, a fluid conduit body which is flexible, and expandable and contractable in accordionlike manner having one end thereof connected in fluid relationship to such outlet which body is carried or supported inside an elongated semitubular substantially rigid shell which restricts and limits the expansion and contraction of the body therein, and permits the body to be extended from such shell at selected points along the length of such shell.

It is another and further object of this my invention to provide a fluid control for an offal or refuse tank with outlet mounted above ground level in a portable house. The outlet is connected in fluid relationship with a conduit body which is flexible, expandable and contractable lengthwise in accordionlike manner, the conduit body being held straight by a semitubular substantially rigid plastic shell which restricts and limits the contraction and expansion of the body within such shell, and permits such body to be extended from such shell at selected points along the peripheral length of such shell for connection to an underground sewer.

It is a further object of my invention to provide for convenient storage of the fluid control unit on a portable house.

It is a further object of my invention to provide protection against rupture or damage of the fluid conduit.

BRIEF DESCRIPTION OF THE DRAWING

The present invention may be better understood and numerous other features and advantages thereof will become apparent to those skilled in the art by reference to the accompanying drawing wherein the like reference numerals refer to like elements in the various figures in which.

DESCRIPTION OF THE PREFERRED EMBODIMENT

Figure 1:
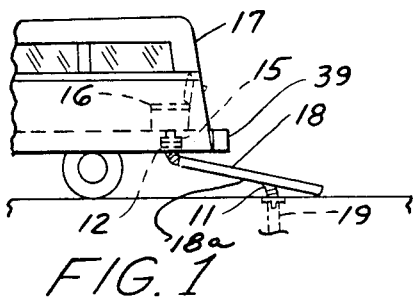
FIG. 1 is a side view of a portable house or trailer showing the sewerage control system installed thereon.
Figure 2:
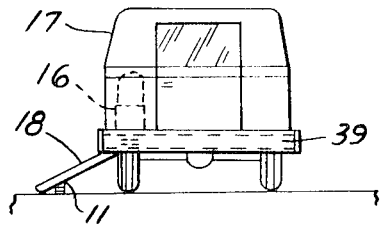
FIG. 2 is a back view also showing the sewerage control system installed thereon.
Figure 3:
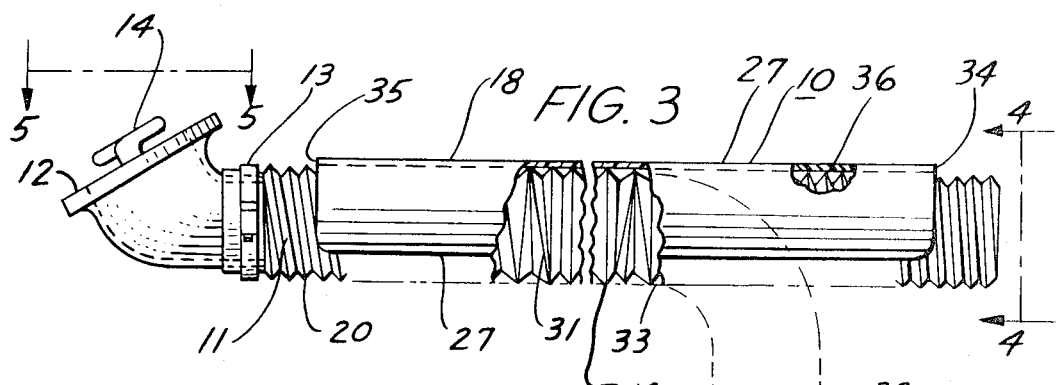
FIG. 3 is a side view of the fluid conduit control.
Figures 4, 5:
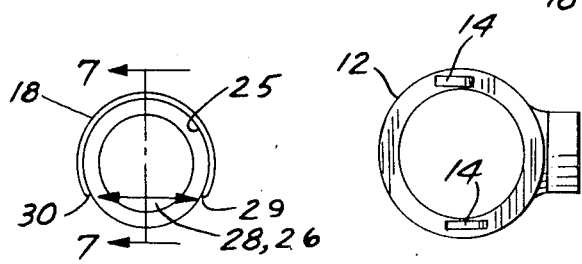
FIG. 4 is an end view of the fluid conduit control taken in direction of arrows 4—4.
FIG. 5 is a plan view of the attachment shown in FIG. 3.
Figure 9:
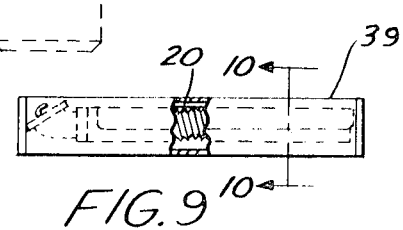
FIG. 9 is a view showing the fluid conduit control stored in the bumper of the vehicle.

Referring now in detail to the drawing and in particular to FIGS. 1—2 and 3, the fluid conduit control is denoted generally by the numeral 10 and is shown as including a conduit body 11, a refuse tank connector 12, and a clamping means 13 for securing said connector to said conduit body and a semitubular shell 18, for supporting said body 11. As shown in FIG. 3, said connector has a bayonet-type lock portion 14 which is fastened to the offal or refuse tank outlet 15, the offal tank or refuse tank 16 being mounted above ground in the portable house 17. As shown in FIGS. 1 and 2, said tank is aboveground and said conduit body is thereby held on an incline with respect to the ground and biased against flexing at its center portion 18a by said rigid semitubular shell, the end of said conduit body opposite the tank being usually inserted into a sewer inlet 19 which is a ground level, to cause said incline and resulting in positive flow of fluids from said tank to said sewer inlet.

Figure 6:
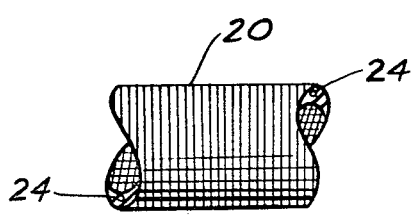
FIG. 6 is a view of a partial section of the conduit in compressed outline.
Figures 7, 10:
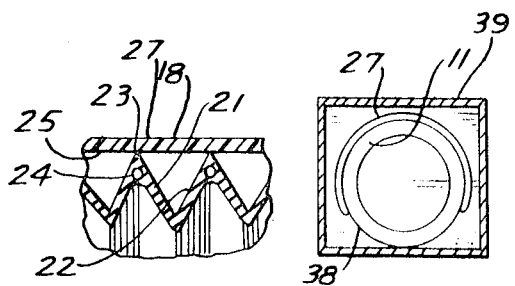
FIG. 7 is a sectional view showing details of construction taken along lines 7—7 of FIG. 4.
FIG. 10 is a sectional view taken along line 10—10 of FIG. 9 showing the storage arrangement of the fluid conduit control.
Figure 8:
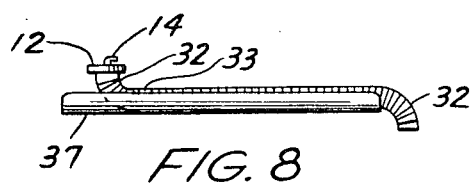
FIG. 8 is a side view showing another position or arrangement of the conduit control.

As shown in FIGS. 3, 4, 6, 7 and 8, said conduit body 11 is comprised of a flexible, elongated, hollow, generally tubular pleated portion 20 having walls 21 folded inwardly 22 from the outside periphery thereof to define peaklike circular vertexes 23 at the outside periphery of which vertex is fastened or contained an annular spring elongated wire coil 24. Said coil is spaced to provide expansion and contraction of the conduit body 11 in accordionlike manner when said coil is compressed or expanded. The said conduit body 11 is thereby expanded to an overall length several times its compressed length as shown in FIGS. 6 and 8. Referring to FIGS. 1, 2, 3, 4 and 7, the shell 18 is shown as controlling and supporting the body 11, and is defined as being elongated and semitubular, with generally thin plastic walls 25 preformed to provide a generally wide elongated gap 26 along the entire peripheral length 27 of said shell. The width 28 of said gap is so constructed that the edges 29 and 30 thereof spread or spring open and contract in response to manual pressure upon insertion and removal of said conduit body vertexes into said shell gap and thereby exerts force or pressure on said vertexes and conduit body 11 to manually releasably secure the conduit body vertexes 23 into selective various expanded or contracted rigid configurations 31 within said shell and to manually releasably permit the operator to extract a selected flexible free length 32 of said conduit pleated portion through said shell gap at any point 33 along said gap while such free length remains connected to a portion of said conduit body which is held rigid and fixed inside said shell.

As disclosed in FIGS. 3 and 8, the conduit body is shown in varied relationship to the controlling shell 18, such as extending out both ends 34 and 35 of said shell or being mounted on top 36 or bottom 37 thereof, or said conduit body may be extended from said shell short of end 34 of said shell to accommodate various conditions met in connecting to said sewers, since the sewer connections in trailer parks or the like are not uniform as to location.

Referring to FIGS. 1, 2, 9 and 10 a preferred means of storing the conduit control is disclosed. Many trailers have a hollow rear bumper 39 for storage of soil pipe conventionally used for a sewer connection in trailer parks and the like, and the compact design of this instant invention, namely the outside diameter 38 and length thereof, which is only slightly larger than the diameter of the required conduit used for sewerage disposal purposes in the cited cases and the length of said shell is constructed shorter than said bumper, which permits the conduit to be compressed completely into said shell, and the said shell to be completely contained lengthwise inside said trailer bumper for traveling.

While a preferred embodiment has been shown and described, various modifications and substitutions may be made without departing from the spirit and scope of the present invention. Accordingly, the present invention has been described by way of illustration and not limitation.

What is claimed is:

1. In a fluid control, the combination of fluid conduit means including an elongated conduit member having a hollow generally tubularly outlined accordion-walled portion which walled portion is contractable axially, expandable axially and bendable axially in its free state, and combined clamping and supporting means including a generally elongated, substantially rigid longitudinally, wall clamping and supporting member having a gripping element operable to releasably engage said accordion-wall portion to selectively secure said wall portion in temporarily substantially rigid fluid passage relationship longitudinally with respect to said clamping and supporting member and to temporarily fix said accordion-walled portion to a selected stretched size longitudinally in contained relationship with said wall clamping and supporting member.

2. In a fluid control system, the combination of, a portable ground supported house offal tank having an above ground outlet, fluid control means including an elongated, generally flexible annular fluid passaged generally tubular accordion-walled section, which section is contractable, expandable, and bendable axially in its free state, said section having an end thereof connected in fluid carrying relationship to said outlet, And holding and clamping means connected to said conduit fluid control means between said outlet and the ground including a generally elongated resilient clamping and holding wall section substantially rigid axially and biased radially to releasably exert manually responsive tension across the peaks of said accordion-walled section to hold at least a substantial portion of said accordion-walled section substantially rigid, substantially straight, to a selected size lengthwise, and at a substantial incline with respect to the ground to facilitate substantially increased drainage flow from said tank outlet through said conduit accordion-walled section.

3. In combination with a portable ground carried house having an offal tank mounted therein including an aboveground offal tank outlet associated with said tank, an offal fluid disposal control, comprising, fluid conduit means including an elongated flexible generally tubular resilient accordion-walled section having peaks and pleats contractable and expandable to various lengths axially, and having an end thereof connected to said outlet in fluid carrying relationship, And clamping and supporting means including a generally elongated resilient clamping and supporting semitubular wall section generally rigid in bending and biased circumferentially to exert tension on said peaks of said conduit accordion-walled section to hold at least a substantial portion of said accordion-wall section self-supporting, rigid, of a selected size longitudinally, substantially straight, and in an inclined relationship axially with respect to the ground to substantially increase drainage flow from said tank through said conduit accordion-wall section.

* * * * *